Aug. 23, 1927.

R. LEYSIEFFER 1,640,003

COMMERCIAL INSCRIBING AND RECORDING MACHINE

Filed Dec. 28, 1925     4 Sheets-Sheet 1

Inventor
Richard Leysieffer
by
attorney

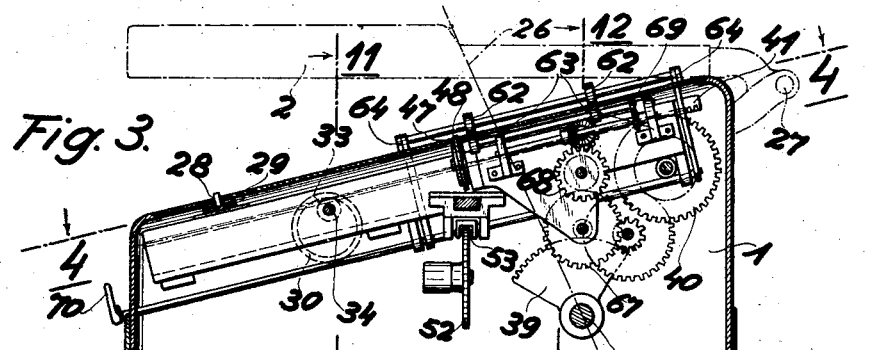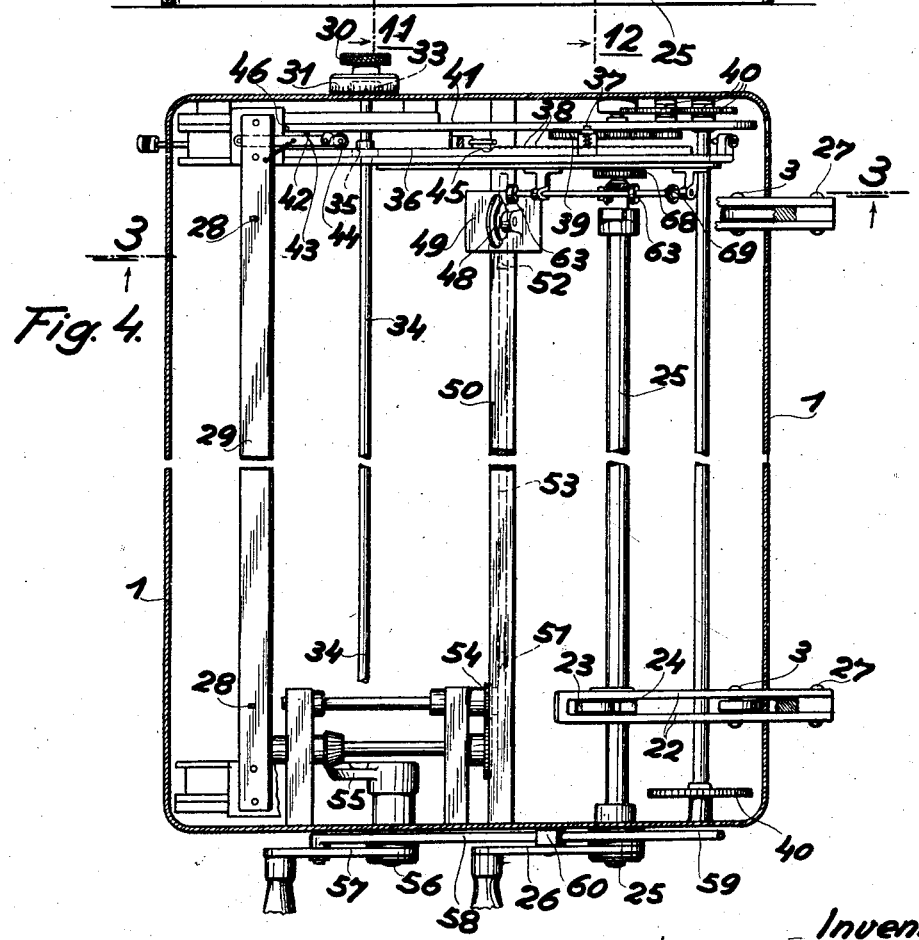

Aug. 23, 1927.
R. LEYSIEFFER
1,640,003
COMMERCIAL INSCRIBING AND RECORDING MACHINE
Filed Dec. 28, 1925 4 Sheets-Sheet 3
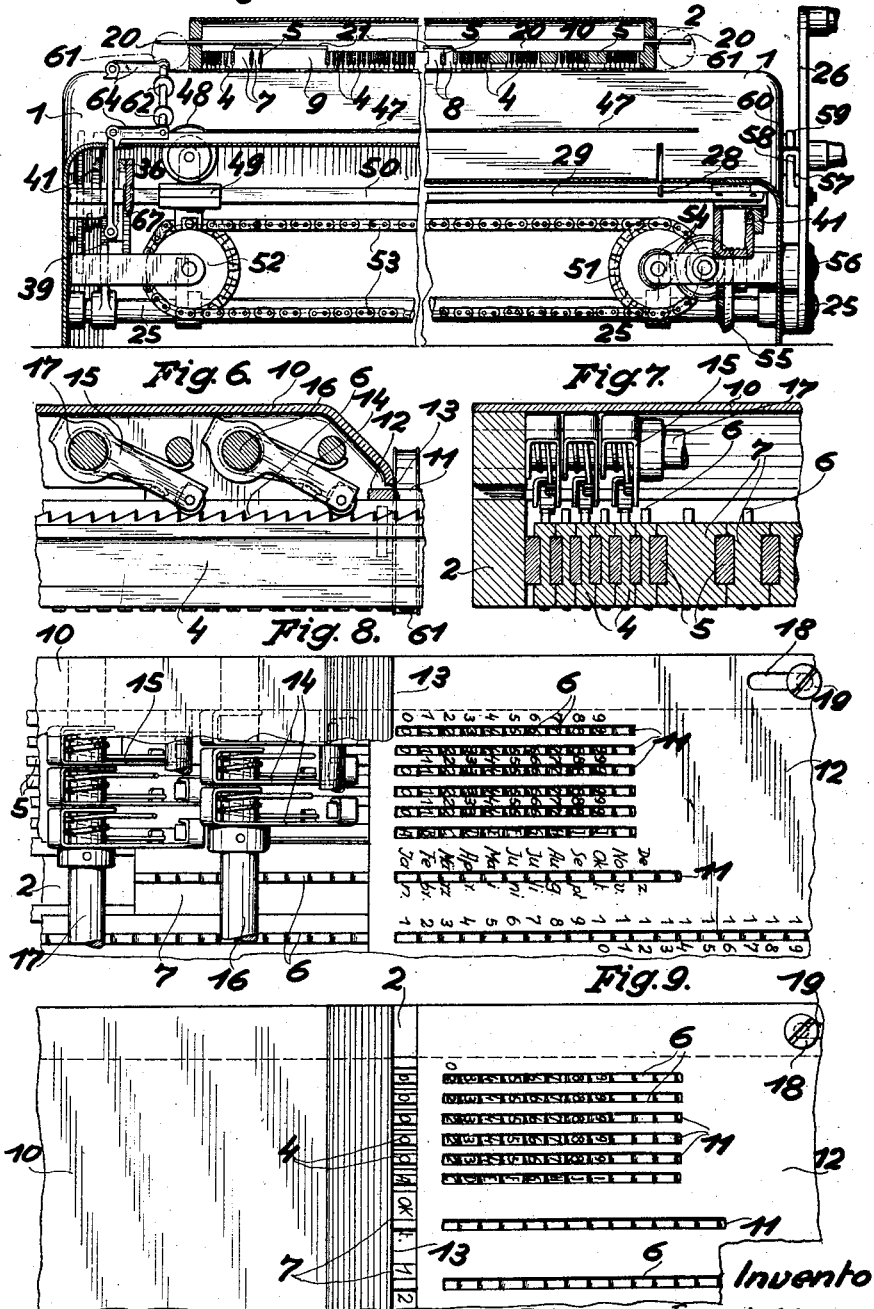

Aug. 23, 1927.
R. LEYSIEFFER
1,640,003
COMMERCIAL INSCRIBING AND RECORDING MACHINE
Filed Dec. 28, 1925 4 Sheets-Sheet 4
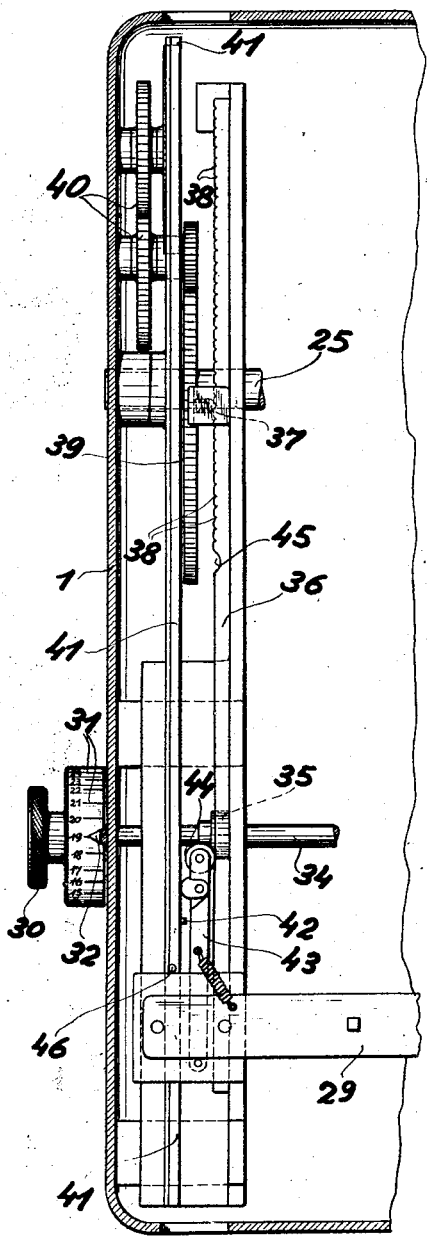
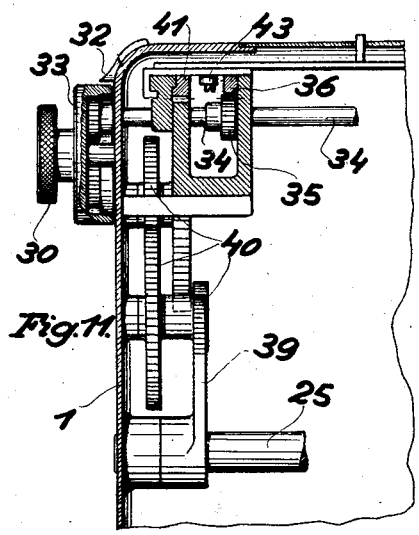
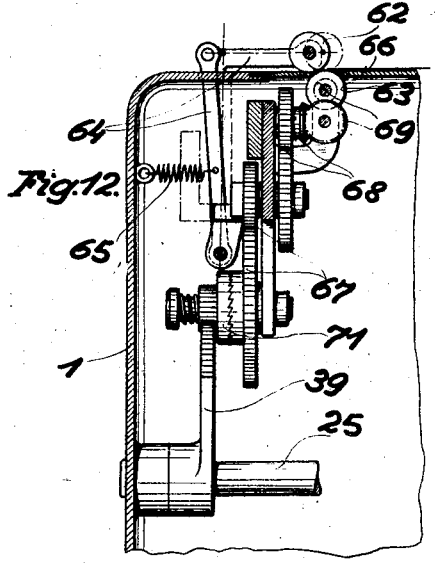
Inventor
Richard Leysieffer
by *[signature]*
Attorney Patented Aug. 23, 1927.

1,640,003

UNITED STATES PATENT OFFICE.

RICHARD LEYSIEFFER, OF GLADBACH, GERMANY.

COMMERCIAL INSCRIBING AND RECORDING MACHINE.

Application filed December 28, 1925, Serial No. 77,995, and in Germany October 24, 1924.

This invention has reference to machines for producing inscriptions, printed matter, perforations and equivalent markings on checks, bank forms and other commercial instruments and the like, and it is intended to increase the adaptability of these machines and to facilitate the manipulation and construction thereof. In accordance with the invention the insertion of the record or inscriptions or the like in the different forms under consideration is effected by means of an imprint or the like which refers to the particular commercial operation or dealing, or banking operations, for instance, or any other records which by means of the machine according to this invention may be impressed on different kinds of commercial forms or the like. Thus, it is possible to uniformly compile on the machine, for instance, the letter of advice for the customer, the copy thereof for the records, the sheet of account for the book-keeping, the statement of account and all other documents and vouchers for correspondence and for the recording of the commercial transaction, so as to make them perfectly agree with each other and to thereby realize an important saving of time and to entirely dispense with the difficulties and drawbacks heretofore occurring in connection with these operations, such such as illegible writing, inaccuracy of numbers, errors in writing, typing and transferring of records and similar difficulties.

The invention will be more particularly described with reference to the accompanying drawings showing by way of example an embodiment of the principles thereof in Fig. 1 in side view with parts in section. Fig. 2 is a plan view seen from the top. Fig. 3 shows a vertical cross section on the line A—B of Fig. 4, and Fig. 4 is a plan view with parts in section and with the covering frame removed. Fig. 5 is a vertical longitudinal section on the line C—D of Fig. 2.

Fig. 6 is a fragmentary longitudinal section through the cover plate, showing one set of the locking pawls for securing the type bars in adjusted position.

Fig. 7 is a vertical transverse section through the parts shown in Fig. 6.

Fig. 8 is a fragmentary plan view of the machine, a portion of the cover plate being broken away to show the locking pawls.

Fig. 9 is a view similar to Fig. 8 showing the grate-shaped plate moved rearwardly to expose the set-up test for inspection.

Fig. 10 is a horizontal section similar to Fig. 4 on an enlarged scale through one side of the machine.

Fig. 11 is a vertical section through that part of the machine shown in Fig. 10 in the plane of shaft 35 and looking toward the front or in the direction toward shaft 25.

Fig. 12 is a similar section in the plane of shaft 25 and looking in the same direction.

Figure 1:
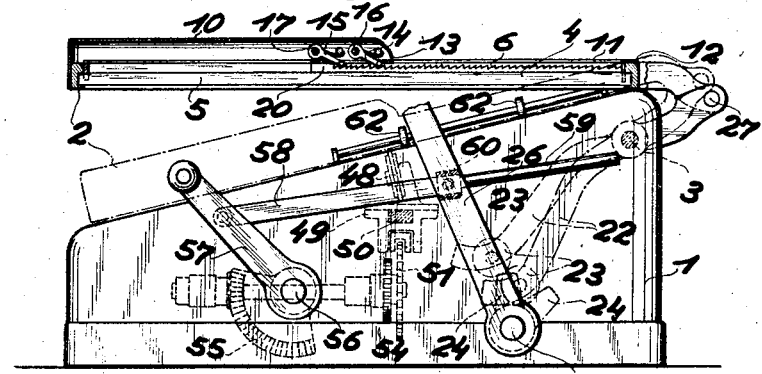
Figure 2:
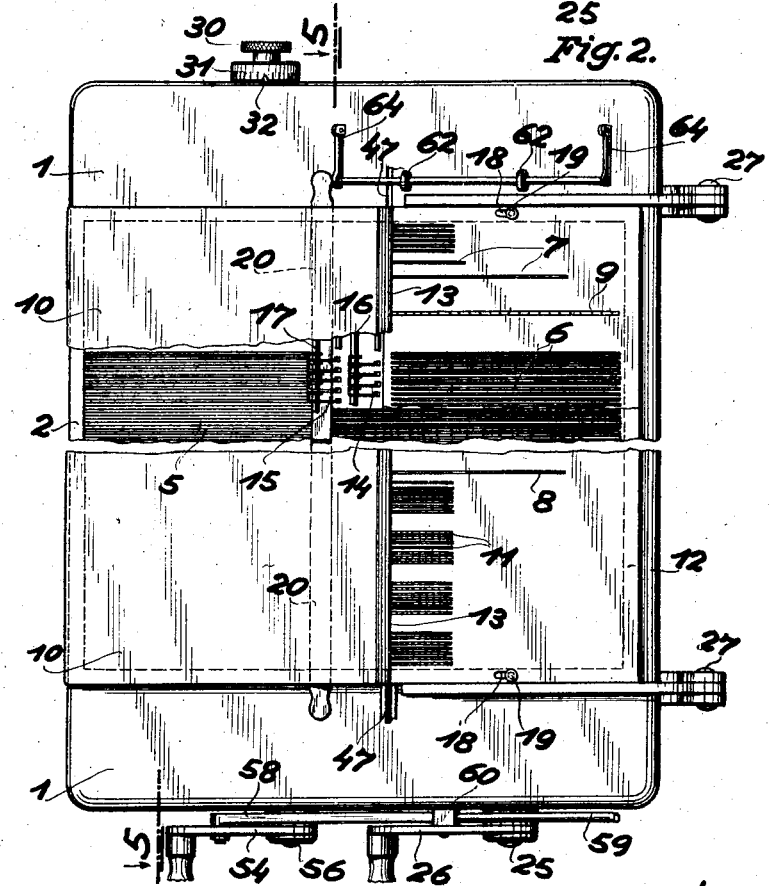

The impressing or record producing device in accordance with this invention comprises a substantially desk-shaped casing 1 and a supporting or printing frame 2 containing the type bars 4 and rockably mounted on the casing at the pivoting point 3. The type bars are of substantially I-shaped cross-section and are adjacently and slidably mounted on the cross bars 5 which are supported at their front and rear ends in the frame 2. At their upper sides the bars 4 are provided with indentations 6 and on their lower surfaces they carry the printing types or the like to correspond with the division of the indentation on the upper side, the designations of the types being marked on or adjacent to the individual indentations on the upper side. Different groups of type bars are provided of which one series comprises rows of numbers from 0–9, while others contain the rows of numbers 0–9, the complete alphabet and various other signs and indications (., - &) and the like arranged consecutively. Additional bars 7, 8 serve for the indication of the dates (month and day) and the bars 9 contain statements or words relating to the particular kind of recording to be performed. In the preferred exemplification of the invention type bars are used which contain rows of numbers, the alphabet and the signs. By means of these last-mentioned bars any suitable printing or similar text of one line may be compiled and by this means the operator is in position to compile in one single line all the statements and indications relating to the commercial operation to be inserted in the forms or blanks, thus for instance the transferring of a remittance on the account of a customer, the number of such account, the date, the particular kind of the transaction, the expiration date, the amount on the debit and on the credit side and the new balance, and to print or multiply these statements in any suitable number of repetitions, thus, for instance, for the different chattels-accounts, personal accounts, advices for the customers, copying book, and for any other proofs that may still be necessary. By this means it is possible to rapidly and accurately manifold book-items secure from mistakes, so that the great labor of copying otherwise necessitated with the ordinary book-keeping systems is entirely dispensed with.

On their upper surface the type bars 4 are covered by a covering plate 10 and a substantially grate-shaped plate 12 provided with slots 11. Through these slots 11 the indentations 6 are exposed and the slots 11 are adapted, moreover, for the insertion of a pencil, rod or the like into the tooth gap corresponding to a particular type for the adjustment of the type bars. For this purpose the pencil or the like with the type bar is moved as far as the rear edge 13 of the plate 12, by which means the type to be set will be positioned exactly at the printing point. Spring-acting locking pawls 14, 15 serve to secure the type bars 4 in their adjusted position. These pawls 14, 15 are disposed in alternating relation adjacent each other on rods 16, 17 so as to be able to provide a locking pawl for each of the adjacently disposed bars 4; as appears from Fig. 8 of the drawing the particular designation of the types may also be additionally indicated between two adjoining slots 11 and upon the grate plate 12, so as to facilitate the ready inspection of these parts of the machine. After the recording or printing text has been completely compiled, the plate 12 is moved rearwardly for the distance of the line spacing and the marginal spacing, in order to be able to inspect and examine the text. The displacement of the plate 12, as shown in Figs. 8 and 9, is made possible by the slots 18 which are engaged by the studs 19. A slide 20 with lateral handles which is guided transversely in the frame 2, serves to return the type bars to their initial position, preferably, however, the date bars 7, 8 and the word bar 9 which will have to be used and remain ready for printing for a longer time than the other bars are not carried along by the slide 20, for which purpose the slide may be provided with recesses 21, as shown particularly in Fig. 5. The return movement of these bars 7-9 may be effected as required by manual operation and by means of a knob or the like projecting through the adjusting slots of the grate.

Upon the rocking shaft 3 of the printing frame 2 a lever 22 is provided which by means of a roller 23 is adapted to rest against a projection or cam 24. This cam 24 is keyed to the stud or shaft 25 of a hand lever 26 by the reciprocation of which the printing frame 2 may be raised to the position shown in Fig. 1 or may be lowered into the position shown in dotted lines. By means of an additional pivoted link 27 on the printing frame 2 this frame may be entirely swung to the rear. In the lowered position the frame 2 is ready for printing while in the raised position of the frame the adjustment, and the insertion and the ejection or displacement of the blank or form to be inscribed may be effected.

The blank, form or the like is placed on the upper surface of the casing 1 so as to rest on the small hooks or the like 28 of a stop bar 29 (Fig. 3) which is transversely displaceable in the casing, and by means of a hand wheel 30 it is adjusted with relation to a certain printing line. The wheel 30, as shown particularly in Fig. 10 of the drawings, carries a graduated division 31 corresponding to the number of lines and to the spacing thereof on the form or blank, and is adjusted by hand and by means of the index 32. The wheel 30 possesses an interior gearing adapted for engagement with a pinion 33 on the shaft 34 of which pinions 35 are disposed which serve for the displacement rack bars 36 displaceably guided on both sides of the machine casing 1. The locking in position of the rack bars 36 is effected by a spring-acting pin 37 engageable with the notches 38 of the bars 36. The displacement of the stop bar 29 together with the form or the like to be inscribed is effected by the rocking movement of the hand lever 26 on the shaft 25 of which a toothed segment 39 is disposed which is operatively engageable with a train of gear wheels 40 and through these is adapted to cause the movement of the rack bars 41 (Figs. 5 and 10) provided on both sides of the casing at a certain distance from the rack bars 36. These rack bars 41 by means of the stops 42 will displace the levers 43 which are pivotally connected to the stop bar 29 and will thereby also carry along the stop bar 29. As soon as the rollers 44 of the levers 43 become engaged with the recesses 45 of the rack bars 36, the stops 42 on the rack bars 41 will move clear of the levers 43, so that the stop bar 29 remains in its position. This position corresponds to the required printing position of the blank, form or the like which has been adjusted by the hand wheel 30. When the lever 26 and the driving gear 40, 41 are swung back, the stops 46 of the rack bars 41 cause the return of the stop bar 29 into its initial position.

After the sheet, form or the like has been moved to its proper operating position, the line to be printed or to be inscribed upon is disposed exactly below the previously adjusted printing set and over a slot 47 of the casing 1 in which an elastic printing roller 48 is adapted to be reciprocated. This roller 48 is rotatably mounted on a carriage 49 (Figs. 1 and 5) slidingly guided on a bar 50 and connected to a chain 53 which is guided on sprocket wheels 51, 52. The sprocket wheel 51 may be turned by means of gear wheels 54 and through the medium of a toothed segment 55 on the axis 56 of which another hand lever 57 is secured. To this lever a pitman-rod or the like 58 is connected the thinner part 59 of which passes through the rotatable eye 60 on the hand lever 26. Above the printing roller 48 an adjustable ink ribbon 61 is provided which extends over the entire length of the printing set. After having been printed or inscribed upon the sheet, form or the like is laterally ejected from the device by the rollers 62, 63 (Fig. 12). The rollers 62 are rotatably mounted on the levers 64 and are normally retained by springs 65 in the position shown in Fig. 12, so as to prevent them from coming in contact with the inserted sheet 66 which therefore may be displaced free from friction by means of the stop bar 29. The rollers 63 are rapidly rotated upon moving the hand lever 26 by means of the toothed segment 39 and the train of gear wheels 67, 68, 69, and after the rollers 62 have been previously moved in the dotted line position shown in Fig. 12 above the rollers 63 by means of a hand lever 70 disposed on the casing 1 (Fig. 3), the sheet or form 66 then disposed between the rollers 62, 63 is moved to the left and is ejected from the device. When the lever 70 is released, the springs 65 retract the roller 62 from the rollers 63. Between the toothed segment 39 and the wheels 67 a coupling member 71 is inserted which is so arranged that the train of gearing 67, 68, 69 can only be moved by the toothed segment 39 in one direction of movement. The movement of the rollers 62 may also be effected automatically.

The mode of operation of the printing or recording device according to this invention is substantially as follows:—After the printing matter has been properly set and examined, the printing frame 2 by the operation of the large hand lever 26 is raised at the front end and then the sheet or form 66 is placed against the pins or hooks 28 of the stop bar 29 which is now in its initial position, and the number of the particular line to be printed upon is adjusted by means of the hand wheel 30. Thereupon the hand lever 26 is swung back again and the printing frame 2 is lowered thereby, while, at the same time, by means of the gear wheels 40, 41 and 43 and the stop bar 29 the frame with the sheet is moved rearwards until the line to be printed or inscribed upon is disposed exactly below the printing matter and below the ink ribbon and above the slot 47 for the printing roller 48. This roller 48 is then moved transversely below the printing matter by the withdrawal of the small hand lever 57, and the printing is thereby effected. Then the large hand lever 26 is again moved forward and the small lever 70 is turned at the same time in such a manner that the ejector rollers 62 are disposed above the rollers 63 which latter by the train of gearing 67, 68, 69 are rapidly rotated, so that the sheet 66 is laterally removed. Upon the rocking of the large lever 26, however, the rearwardly rocked small lever 57 is also moved back to its initial position by the impact of the eye 60 against the thicker portion of the rod 58 and by this means the printing roller 48 is also returned to its initial position. In a similar manner the stop bar 29 is moved back to its initial position by the stops 46 and the entire cycle of operations is thereby terminated and another sheet, blank, form or the like may be inserted in the machine and may be printed, inscribed or similarly operated upon.

It should be pointed out that the invention is not restricted to the particular form, configuration and arrangement of parts herein shown and illustrated by way of exemplification merely, but it is susceptible of modifications and changes both in the construction of the parts, their shape and mutual arrangement, except as otherwise stated and defined in the claims hereunto appended.

I claim:—

1. In a record inscribing apparatus, in combination, a casing, a bank of parallel slidable type bars each having printing characters on one of its faces and each having a face exposed exteriorly of the casing and provided with surfaces equal in number to the printing characters for the engagement therewith of a scriber or like manually manipulable implement, whereby said type bars may be adjusted to bring any printing characters thereof into printing position, and in registry with characters of other similarly adjusted bars of the bank for setting a line text transversely disposed with relation to the bars in the adjusted position thereof, a sheet support movable in parallel relation to the type bars, and means for moving the sheet support into and out of printing relation to the type bars.

2. In a record inscribing apparatus in combination, a type frame, a plurality of adjustable parallel type bars on said frame, a sheet-support movable in parallel relation to the type bars and engageable therewith, means to rock the type frame into and out of engagement with the sheet-support, and pressing means movable with relation to the type bars and the sheet-support and adapted to crowd the type bars and the sheet of material carried by said support into engagement with each other.

3. In a record inscribing apparatus in combination, a type frame, a plurality of adjustable substantially adjacently disposed parallel type bars on said frame, a sheet-support movable in parallel relation to the type bars and engageable therewith, means to rock the type frame into and out of engagement with the sheet-support, setting means for the sheet-support and moving means for the sheet-support engageable with the setting means, and pressing means movable with relation to the type bars and the sheet-support and adapted to crowd the type bars and the sheet of material carried by said support into engagement with each other.

4. In a record inscribing apparatus in combination, a type frame, a plurality of adjustable and substantially adjacently disposed parallel type bars on said frame, a sheet-support movable in parallel relation to the type bars and engageable therewith, means to rock the sheet support and the type frame relatively to each other and into and out of engagement, setting means for the sheet-support and moving means for the sheet-support engageable with the setting means, pressing means movable with relation to the type bars and the sheet-support and adapted to cause the type bars and the sheet of material carried by said support to be operatively engaged with each other, and clamping and ejecting means for the sheet of material.

5. In a record inscribing apparatus in combination, a type frame, a plurality of adjustable and substantially adjacently disposed parallel type bars on said frame, a sheet-support movable in parallel relation to the type bars and engageable therewith, means to rock the type frame into and out of engagement with the sheet-support, setting means for the sheet-support, moving means for the sheet-support engageable with the setting means and adapted for operative engagement with the rocking means for the type frame, pressing means movable with relation to the type bars and the sheet-support adapted to crowd the type bars and the sheet of material carried by said support into engagement with each other, and link connection between the pressing means and the moving means for the sheet-support.

6. In a record inscribing apparatus in combination, a type frame, a plurality of adjustable parallel type bars on said frame, a sheet-support movable in parallel relation to the type bars and engageable therewith, rocking means for the type frame into and out of engagement with the sheet-support, setting means for the sheet-support, rack bars operatively engageable with the setting means, an operating lever engageable with the rocking means, gearing on said lever and relatively engageable stops on said gearing and on the rack bars and operative connection between the gearing and the sheet-support, adapted to move said support to its adjusted position to correspond with the adjustment of the type bars, and pressing means movable with relation to the type bars and the sheet-support adapted to crowd the type bars and the sheet of material carried by said support into engagement with each other.

7. In a record inscribing apparatus in combination, a type frame, a plurality of adjustable parallel type bars on said frame, a sheet-support adjustably movable in parallel relation to the type bars and engageable therewith, setting means for the sheet support, rocking means for the type frame to move the same in and out of engagement with the sheet-support, an operating lever to effect the movement of the sheet-support and engageable with the rocking means, a pressing roller transversely movable with relation to the type bars and the sheet-support, adapted to crowd the type bars and the sheet of material carried by said support into engagement with each other, an operating lever for the pressing roller, link connection of said lever with the operating lever for the sheet-support, and clamping and ejecting means for the sheet of material.

8. In a record inscribing apparatus in combination, a type frame, a plurality of adjustable parallel type bars on said frame, a sheet-support movable in parallel relation to the type bars and engageable therewith, means to rock the type frame into and out of engagement with the sheet support, adjusting and moving means for the sheet-support, a hand lever on said adjusting and moving means, superimposed partly spring-acting clamping rollers engageable with the sheet of material on both sides thereof, gearing on the hand lever operatively connected to certain of said clamping rollers, and movable pressing means to crowd the type bars and the sheet of material carried by said support into engagement with each other.

9. In a record inscribing apparatus in combination, a type frame, a plurality of adjustable parallel type bars on said frame, a sheet-support movable in parallel relation to the type bars and engageable therewith, means to rock the type frame into and out of engagement with the sheet-support, moving means for the sheet-support, a hand lever on said moving means, partly spring-acting clamping rollers engageable with the sheet of material, gearing on the hand lever operatively connected to certain of said clamping rollers, a clutch member intermediate the hand lever and the gearing and adapted to cause the gearing to operate in one direction only, and movable pressing means to crowd the type bars and the sheet of material carried by said support into engagement with each other.

10. In a record inscribing apparatus, a casing having a face plate, a plurality of adjustable parallel bars, types axially disposed on the lower faces of said type bars, so as to produce reading matter transversely disposed with relation to the type bars in the adjusted position thereof, the upper faces of said bars having surfaces corresponding in arrangement with the types for engagement therewith of manually manipulable means whereby the type bars may be shifted into and out of printing position. means to lock the type bars in the adjusted position, means to return the type bars to their initial position, and a sheet support for carrying a sheet of material to be brought into contact with the type bars.

11. In a record inscribing apparatus, a type frame, a plurality of adjustable, substantially adjacently disposed parallel type bars, types in axial alinement on said type bars, means to lock the type bars in the adjusted position, a slide axially disposed with relation to the type bars and engageable therewith to return certain of said bars to normal position, said slide being structurally formed to adapt it to miss other type bars and to prevent such other type bars becoming engaged with the slide in the return movement of the bars returned to normal position by the slide, and a sheet support for carrying a sheet of material to be brought into contact with the type bars.

12. In a record inscribing apparatus, a parallelly slotted type frame movable longitudinally of the slots, a plurality of adjustable parallel type bars in vertical alignment with the slots in the type frame, types on the lower surface of said type bars, guiding means for the type bars, spring-acting locking pawls engageable with the type bars, a sheet-support, and means to move the type frame and the sheet-support into and out of coactive relationship with each other.

13. In a record inscribing apparatus, a face plate having parallel slots therein, a type frame, a plurality of adjustable parallel type bars mounted on said frame, single types in axial alinement on certain of said type bars and word types on certain others of said type bars, so as to produce reading matter transversely disposed with relation to the bars in the adjusted position thereof, said types being disposed on certain faces of the bars and the bars having other faces provided with surfaces corresponding in arrangement with the types and exposed through the slots in the face plate for engagement therewith of manually manipulable means whereby the type bars may be shifted into and out of printing position, means to lock the type bars in their adjusted position, and a sheet support movable with relation to the type bars.

14. In a record inscribing apparatus, a type frame, a plurality of adjustable parallel type bars mounted on said frame, types on said type bars, a sheet-support, means to move the type frame and the sheet-support relatively to each other, a pressing and printing roller operatively associated with the type bars and the sheet support and adapted to crowd the sheet of material carried by said support and the types into engagement with each other, a chain drive operatively connected to said pressing roller, and a hand lever mounted on said chain drive.

15. In a printing apparatus, a bank of parallel type bars adjustable to a printing position, each bar bearing on one face a longitudinal row of printing type, the type matter on the bars being such that by adjustment of selected bars to printing position a line of reading matter extending transversely of the bars may be composed for printing. each bar also having a face provided with surfaces equal in number to and registering with the individual type thereon, said surfaces being exposed for the engagement therewith of a manipulable element whereby the bars may be adjusted to printing position.

In testimony whereof I affix my signature.

RICHARD LEYSIEFFER.